Patented July 11, 1939

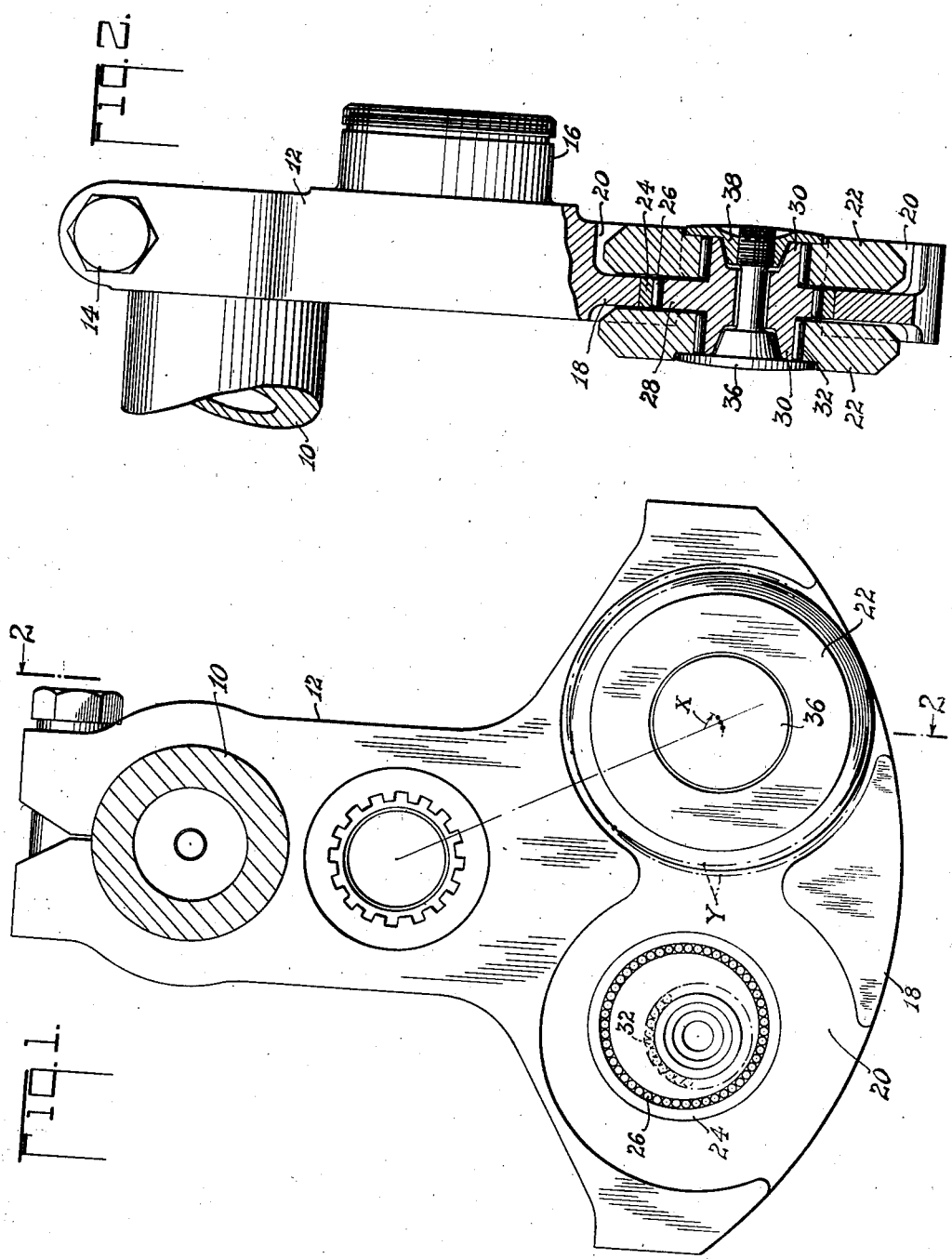

2,165,463

UNITED STATES PATENT OFFICE 2,165,463

DYNAMIC TORQUE BALANCER

Roland Chilton, Ridgewood, N. J., assignor, by mesne assignments, to Wright Aeronautical Corporation, Paterson, N. J., a corporation of New York Application October 16, 1937, Serial No. 169,348

7 Claims. (Cl. 74—604)

This invention relates to the class of torsional vibration damper wherein a pendulum mass is suspended from the shaft so as to have, when stabilized by centrifugal force, a frequency which increases in direct proportion to the rotational speed of the shaft wherefore the pendulum makes the same number of swings per crankshaft revolution at all revolutional speeds. It is known that such pendulums, if made synchronous with the impulses to which the shaft is subject, will swing 180° out of phase with those impulses which are, accordingly, neutralized to the elimination of torsional vibrations.

The required effective pendulum length of multi-cylinder engines, such as contemplated in the showings, is relatively small (of the order of ⅜") which is a smaller effective length than can be obtained by simple single pivotal suspension with the large dampening masses here desired.

Accordingly, "bi-filar" suspension has been resorted to in the art, wherein eccentric means of the desired small radius support the weight at spaced points whereby all elements of the weight follow arcuate paths equal to the radius described by the eccentric means.

Single eccentric suspension means in combination with auxiliary guiding means to prevent rotational movement of the weight relative to the shaft have also been proposed (Bleecker application Serial Number 169,358, filed October 16, 1937, and Chilton application Serial Number 172,557, filed November 3, 1937. The present invention teaches how the auxiliary guiding means may be omitted by sub-dividing the active weight into circular masses which may be left free to drift in rotation without in any way disturbing the balance and/or dynamic damping effects. Where large masses are needed as in radial aircraft engines, a plurality of weights are needed to get the desired aggregate active mass within the confines of the available space which in current designs is fully occupied by the conventional rigid weight.

Other objects and advantages of the invention will be obvious from the following description with reference to the drawing, in which:

Fig. 1 is an axial view, in section through the crankpin, and

Fig. 2 is a side view in part section on the line 2—2 of Fig. 1.

In the drawing, 10 designates the crankpin of a conventional crankshaft to which is clamped a rear cheek 12 by the usual clamp bolt 14. The crank cheek 12 is provided with the usual rear journal 16 and further with an extension 18 having the same general profile as a conventional counterweight, as seen in Fig. 1. This projection is recessed on either side to form pockets 20 in each of which there is disposed a circular counterweight mass 22 of disc form. The extension 18 is provided with raceways 24, one of which is seen in the left hand side of Fig. 1, and supported on rollers 26, in these raceways, are eccentrics 28 having integral eccentric pins 30 projecting on either side. These eccentric pins are provided with rollers 32 whereby they carry the counterweight discs 22, the assembly being retained in place by a retaining bolt 36 and companion nut 38.

The radius arrow X in Fig. 1 denotes the eccentricity of the eccentric members 28—30 upon which the discs oscillate through a small angle, as indicated by the dotted lines Y denoting the extreme positions of swing.

It will be seen that the eccentric pins 30 are free to rotate within the counterweight masses 22 whereby the eccentrics may swing without introducing any polar or rotational movement in the weights, each point of which will follow an arcuate path identical with that described by the radius X. The pendulum frequency is, accordingly, that of a "simple" pendulum of pendulum length X. The pivoting of the masses 22 on the eccentric pins 30 permits rotational creep of the masses without having any effect on the frequency of swing thereof, since the masses are concentric with the pins 30. Due to this concentricity, no stabilization of the masses is needed.

Although two sets of masses 22 are shown, a greater plurality could be used. The distance X for any set of masses may be adjusted so that the several sets may have divergent frequencies of oscillation in accordance with torsional impulses of different frequencies that may be present in the power plant.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with a shaft member having an opening, of a counterweight mass comprising a disc having a central opening, and means comprising relatively eccentric journals respectively rotatably engaging in said openings for the pendulous support of the disc whereby the disc is forced to partake of the arcuate travel of the journal means and is free to drift rotationally thereon.

2. In combination with a shaft extension member having an opening, a plurality of masses each having an opening at its center of gravity, and means comprising relatively eccentric journals respectively rotatably engaging said openings whereby the discs are free to swing arcuately with said eccentric journal means relative to the member and are free to drift rotationally on said journal means.

3. In combination with a shaft extension having an opening, a circular counterweight element having an opening at the center thereof, and a member comprising relatively eccentric journals respectively rotatably engaging within said openings for pendulously supporting said counterweight, said weight being thus free to swing with but to rotate relative to said eccentric journal member.

4. In combination, a shaft extension member having an opening, a pin freely rotatable therein, journals on the ends of and eccentric to the pin, and circular counterweight masses each having a central bearing rotatably engaging one said journal.

5. In combination, a shaft extension member having an opening, a counterweight disc on each side of said member, said discs having central aligned openings eccentric to the member opening, and pin means comprising relatively eccentric journals respectively freely rotatable both in said member and in said discs for supporting said discs on said member.

6. In combination, a shaft extension member having an opening, a counterweight disc on each side of said member, said discs having central aligned openings eccentric to the member opening, pin means comprising relatively eccentric journals respectively freely rotatable both in said member and in said discs for supporting said discs on said member, and means to locate said discs and pin means axially relative to said extension member.

7. In combination, a shaft extension having an opening, pin means concentric with and substantially filling said opening and in bearing engagement therewith, journals on the ends of and eccentric to said pin within the confines of the pin circumference and of smaller diameter than the pin, and counterweight discs each having a central opening smaller than the extension opening within which one of said journals is rotatably engaged, said discs being bodily swingable relative to the extension by virtue of the journal eccentricity relative to the pin.

ROLAND CHILTON.